May 30, 1933.  C. M. LOWER  1,911,233
COMMERCIAL INCUBATOR
Filed Oct. 17, 1929  3 Sheets-Sheet 1
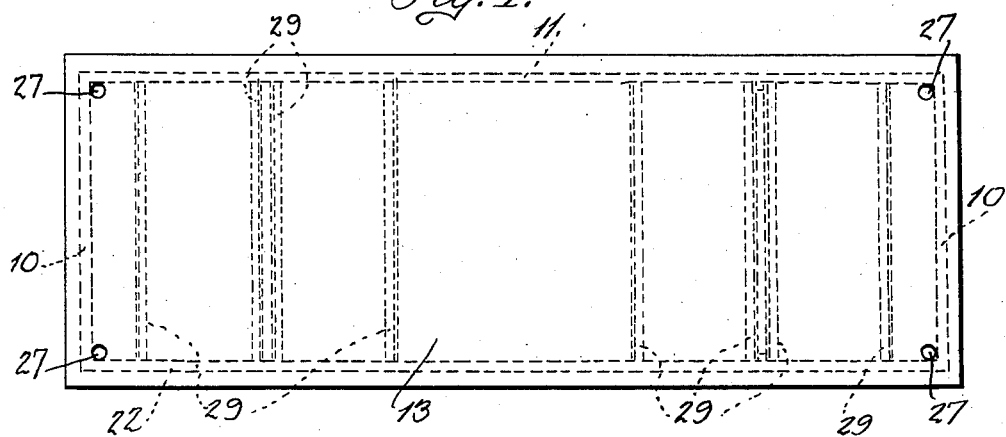
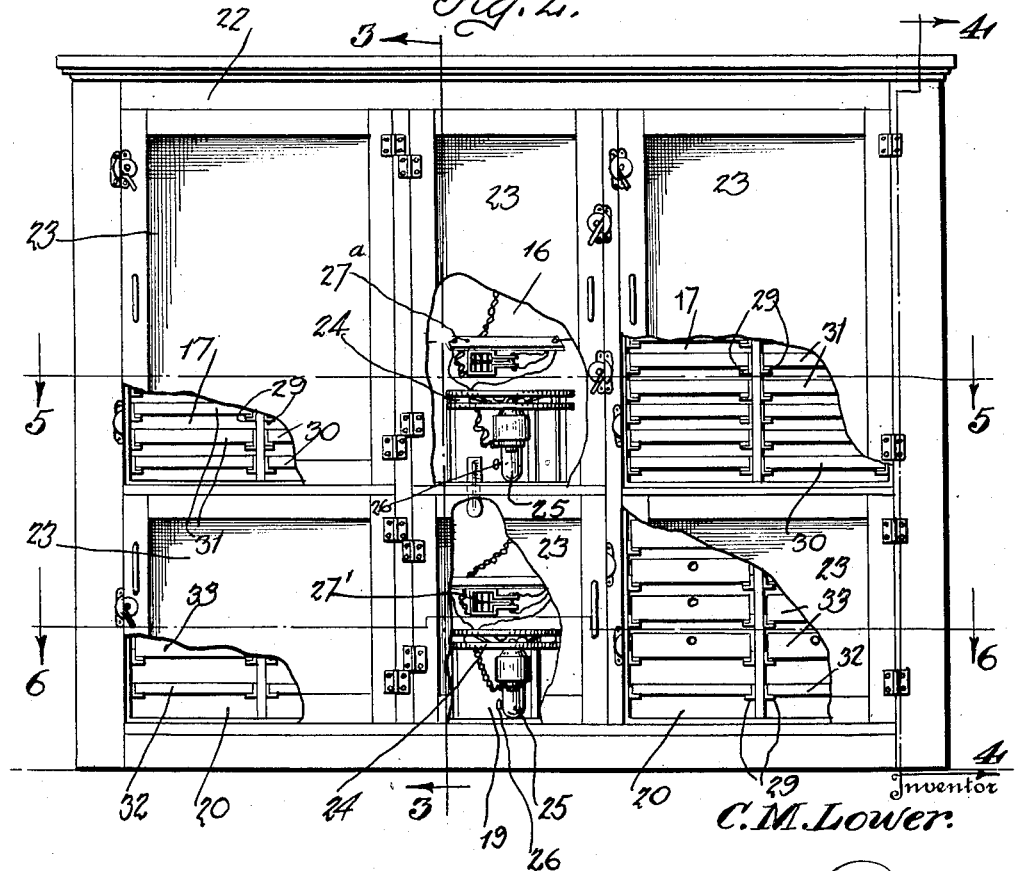
Inventor
C. M. Lower.
By
Attorney

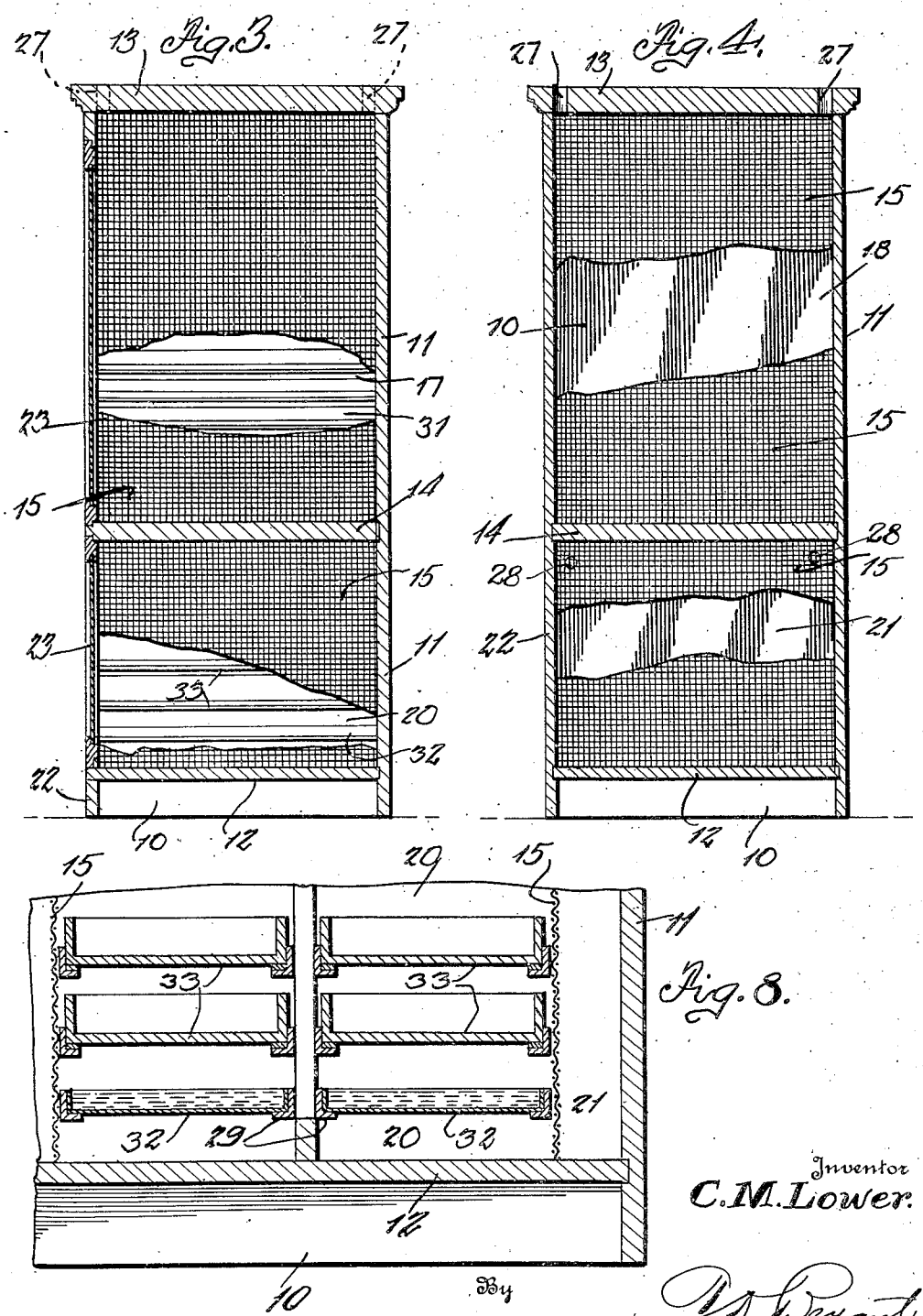

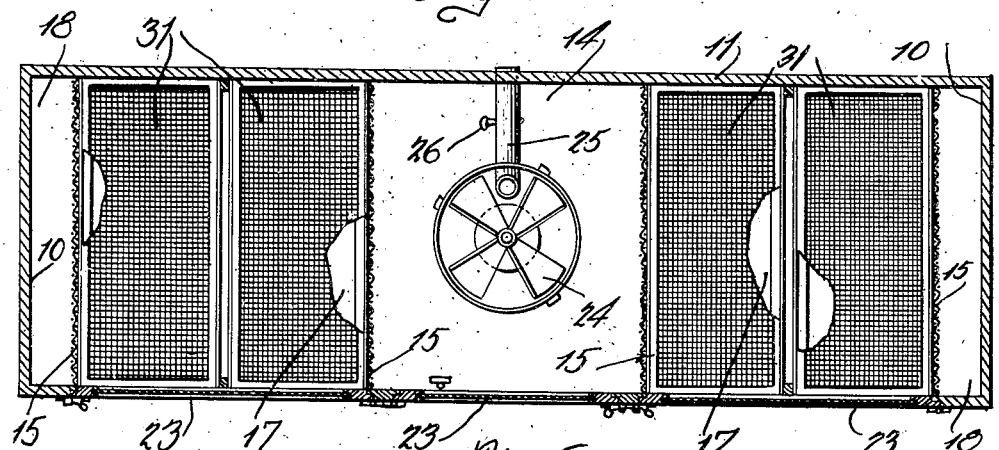
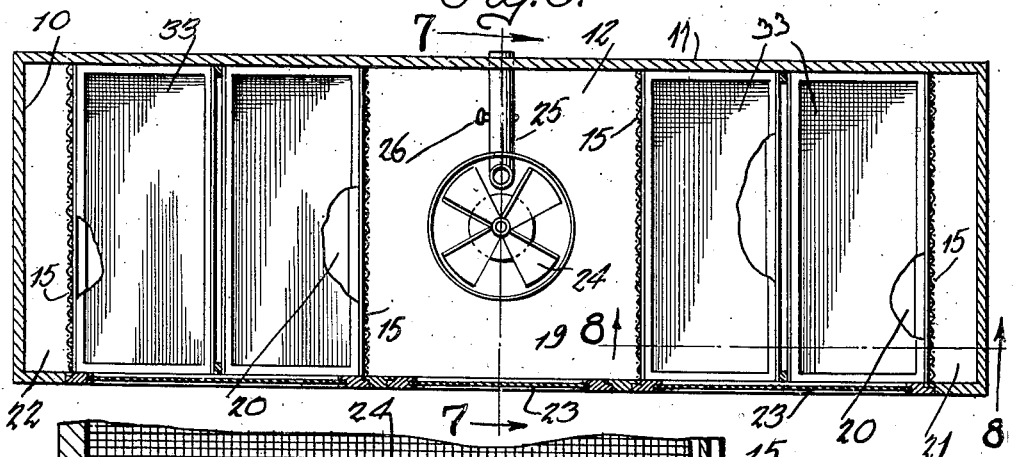
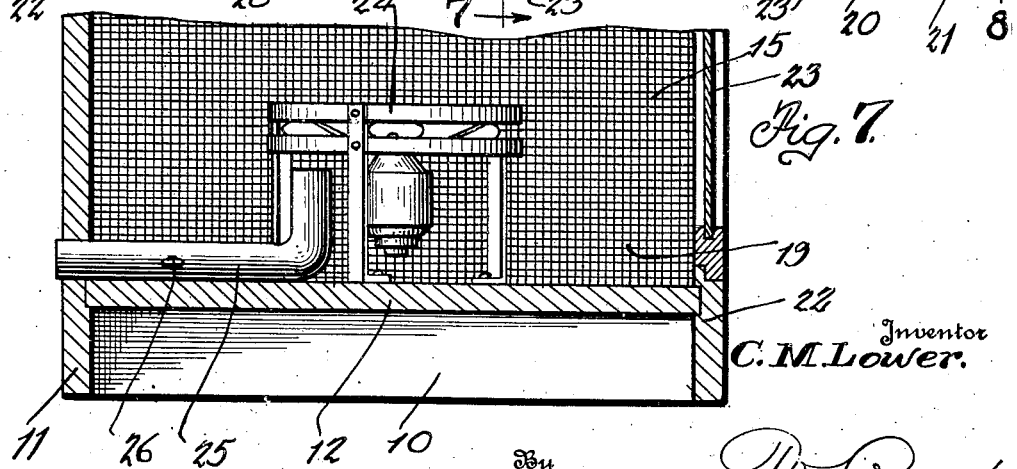

Patented May 30, 1933

1,911,233

UNITED STATES PATENT OFFICE

CLAUDE M. LOWER, OF STURGIS, MICHIGAN

COMMERCIAL INCUBATOR

Application filed October 17, 1929. Serial No. 400,276.

This invention relates to incubators for hatching chickens and has special reference to an incubator designed for the incubating of large quantities of eggs.

One object of the invention is to provide an improved general construction of incubator of this type.

A second important object of the invention is to improve the air and heat distribution in such an incubator, the fresh air being taken in at the bottom of each chamber through a pipe of proper dimensions controlled by a suitable damper.

A third important object of the invention is to provide a novel air intake and fan arrangement in such an incubator wherein the air intake opens directly below a motor driven fan. A fourth important object of the invention is to provide a novel heater arrangement for such an incubator wherein the heating element is placed directly above the fan.

A fifth important object of the invention is to improve the circulation of the air in such an incubator by arranging the air outlets at the corners of the incubator compartments remote from the fans.

My theory of the most perfect mode of heating and ventilation is that the entire system should coordinate with the natural physical laws as nearly as possible; hence the fan or fans should be placed as near as may be to the bottom of each chamber and the heating elements should be adjacent to and immediately above each respective fan as the cold air naturally gravitates to the bottom of the compartment; the air being heated by the electrically equipped heating elements naturally rises and is augmented in its natural action by the force of said fans, thereby forcing the air to the furthermost upper portions of chamber.

Uniform purity of air and evenness of temperature are highly desirable for best results of incubation therefore the theory of the principles involved herein, is that the cool fresh air taken into the machine should not be allowed to pass over the eggs before the same is heated, but should be thoroughly warmed first, thence this process requires that the fresh air be taken into the machine immediately under the fan, mixed with the already warmed air, passed over the heating element and sent on its way to circulate through the entire chamber.

It is common knowledge that when cool air and warm come in contact that precipitation of moisture is the inevitable result, and unless the air is thoroughly mixed immediately, so called "dead air pockets" would naturally have a tendency to form and thereby cause an uneven distribution of the air, both as to moisture and temperature.

The air outlets of this machine, being placed at the upper extreme corners of the compartments, where dead air pockets are liable to form, absolutely avoid this difficulty as the inactive air in the corners is forced in motion on its course outward while leaving the machine. It is common knowledge that stale or dead pockets are most liable to form at points of least disturbance by the fan; hence the upper corners, being the greatest distance from the fan and offering the greatest resistance to air circulation, are ventilated by the aid of the law of gravitation forcing the warm impure air through these particular areas which offer the greatest resistance to artificially forced ventilation.

With the above and other objects in view, the invention consists in general of certain novel features of construction and combinations of parts now to be fully described, illustrated in the accompanying drawings and specifically claimed.

In the accompanying drawings like characters of reference indicate like parts in the several views, and:—

Figure 1 is a plan view of the improved incubator;

Figure 2 is a front elevation of the incubator, portions of the doors and front wall being broken away to show the interior mechanism;

Figure 3 is a section on the line 3—3 of Figure 2;

Figure 4 is a section on the line 4—4 of Figure 2;

Figure 5 is a section on the line 5—5 of Figure 2;

Figure 6 is a section on the line 6—6 of Figure 2;

Figure 7 is an enlarged detail section on the line 7—7 of Figure 6; and

Figure 8 is an enlarged detail section on the line 8—8 of Figure 6.

The incubator, in the form here shown is of general elongated rectangular form having side walls 10 and a rear wall 11 supporting a floor or bottom 12 and covered by a roof or top 13. Extending between the end walls and fitting tightly against the rear wall is a horizontal partition 14 preferably positioned about one third of the distance from the floor 12 to the top 13 above said floor for reasons which will be presently understood. Vertical screen wire partitions 15 extend from the horizontal partition to the top 13 and also to the bottom 12. Two of these partitions 15 are spaced equally from the center of the width of the incubator and two others are placed adjacent the end walls so that this partition arrangement provides an upper central machine chamber 16 on each side of which is an incubating chamber 17 having an air circulating space 18 between it and the adjacent side wall and also provides a lower central machine chamber 19 having lateral hatching chambers 20 and air spaces 21 below the corresponding chambers just mentioned. The front of the incubator is provided with a wall 22 having suitable door openings so arranged that there is a separate opening for each chamber, said openings being closed by doors 23 so that each door affords opening to a particular chamber and thus a lower door may be opened without interfering with the conditions in the upper chamber and the opening of an upper door will not affect the conditions in the lower chambers.

Just above the floor and centrally of each machine chamber is a motor driven fan 24 the axis of which is vertical, these fans being arranged to drive air upwardly. Leading in from the back wall are air supply pipes 25 each of which has its inner end turned up to deliver air immediately below the fan blades and in each pipe 25 there is a damper 26 so that the flow of air through these pipes may be properly regulated. In the roof 13 adjacent each end are provided outlet openings 27 for the upper chambers and similarly located outlet openings 28 are provided for the lower chambers, going through the end walls at respective corners of the lower chamber.

Immediately above each fan is an electric heating element so that air blown by the fan will be heated before it spreads through the chambers and thus injurious chilling of part of the eggs or chicks will be prevented, this action being aided by the positions of the outlets which prevent the formation of dead air spaces and consequent cooling at the points where such dead air exists.

Rails 29 extend from front to rear of each incubating and hatching chamber and in the incubating chambers these rails support, at the bottom, water pans 30, and above the bottom, egg trays 31 having screen bottoms which are thus readily movable. In the hatching chambers these rails support similarly arranged water pans 32 and hatching trays 33 having solid bottoms.

With the incubator constructed in this manner, the incoming air will be circulated in the natural manner, that is, the hot fresh air will rise and spread laterally, the screen wire partitions will choke the flow so that uniform temperature will be obtained in all parts of each chamber, the temperature of the upper chamber being, of course, slightly less than that in the lower chamber so that there will be a greater moisture content in the hatching chambers than in the incubating chambers. Moreover, the screen wire partitions adjacent the side walls permit free escape of the used air to the outlets as the spaces adjacent said walls are uninterrupted. Obviously, the water in the hatching chamber pans may contain a suitable, more or less volatile, disinfectant so that the young chicks may be kept free of diseases. Suitably supported thermostats 27' may be used to regulate the operation of heater elements 27a.

There has thus been provided a simple and efficient device of the kind described and for the purpose specified.

It is obvious that minor changes may be made in the form and construction of the invention without departing from the material principles involved. It is therefore desired that the invention shall not be limited to the exact form of the present embodiment but shall cover all forms coming within the scope claimed.

Having thus described the invention, what is claimed is:—

1. An incubator including a casing having spaced foraminous partitions dividing the casing into a central machine section and lateral egg holding sections, said casing having a top having outlet openings at the extreme upper corners of the casing and said top being otherwise imperforate, a fan rotatably mounted on a vertical axis centrally of the lower part of the central compartment and arranged to direct air upwardly, a heater directly over and close to the fan to receive and heat air from the fan, and means to introduce fresh air directly beneath the fan, said foraminous partitions consisting of fine mesh wire netting and serving to choke the flow of air from the central section to the lateral sections and to cause even distribution of air to all parts of the lateral sections.

2. An incubator including a casing having spaced foraminous partitions dividing the casing into a central machine section and lateral egg holding sections, said casing having a top having outlet openings at the extreme upper corners of the casing and said top being otherwise imperforate, a fan rotatably mounted on a vertical axis centrally of the lower part of the central compartment and arranged to direct air upwardly, a heater directly over and close to the fan to receive and heat air from the fan, a pipe extending inward from the rear of the casing and having an upturned end opening centrally beneath the fan, a damper in said pipe, and said casing having air passages between the egg holding compartments and the ends of the casing to permit down flow of air at said ends, said foraminous partitions consisting of fine mesh wire netting and serving to choke the flow of air from the central section to the lateral sections and to cause even distribution of air to all parts of the lateral sections.

3. An incubator including a casing having four fine mesh wire net partitions extending from top to bottom of the casing, one pair of said partitions being spaced at each side of the center and the second pair of partitions being spaced slightly from the ends of the casing and positioned between the first partitions and the casing ends, the top of the casing having openings communicating with the spaces between the second pair of partitions and the ends of the casing, said partitions forming a central chamber, a pair of incubating chambers, one at each side of the central chamber and air passages between the incubating chambers and respective ends of the casing, a motor having a vertical shaft and mounted centrally of the lower part of the central chamber, a fan mounted on said shaft immediately above said motor, and a valved fresh air pipe leading from the back wall of the casing and having an upturned end opening vertically beneath the fan and to one side of the motor.

In testimony whereof I affix my signature.

CLAUDE M. LOWER.